(12) United States Patent
Arora et al.

(10) Patent No.: US 8,896,086 B1
(45) Date of Patent: Nov. 25, 2014

(54) SYSTEM FOR PREVENTING TAMPERING WITH INTEGRATED CIRCUIT

(71) Applicants: Mohit Arora, Faridabad (IN); Prashant Bhargava, Gurgaon (IN); Rishi Bhooshan, Ghaziabad (IN)

(72) Inventors: Mohit Arora, Faridabad (IN); Prashant Bhargava, Gurgaon (IN); Rishi Bhooshan, Ghaziabad (IN)

(73) Assignee: Freescale Semiconductor, Inc., Austin, TX (US)

( * ) Notice: Subject to any disclaimer, the term of this patent is extended or adjusted under 35 U.S.C. 154(b) by 76 days.

(21) Appl. No.: 13/905,150

(22) Filed: May 30, 2013

(51) Int. Cl.
*H01L 23/02* (2006.01)
*H01L 23/00* (2006.01)

(52) U.S. Cl.
CPC ............................ *H01L 23/576* (2013.01)
USPC ........... 257/499; 257/428; 257/678; 257/686; 257/738; 257/E21.047

(58) Field of Classification Search
CPC ... H01L 23/02; H01L 23/576; H01L 27/1446; H01L 21/44
USPC ........... 257/428, 499, 678, 686, 736, E21.047
See application file for complete search history.

(56) References Cited

U.S. PATENT DOCUMENTS

| 5,389,738 | A | 2/1995 | Piosenka | |
|---|---|---|---|---|
| 7,180,008 | B2 * | 2/2007 | Heitmann et al. | 174/261 |
| 7,498,644 | B2 * | 3/2009 | Shapiro et al. | 257/428 |
| 7,868,441 | B2 * | 1/2011 | Eaton et al. | 257/686 |
| 7,923,830 | B2 | 4/2011 | Pope | |
| 8,240,038 | B1 * | 8/2012 | Pham et al. | 29/846 |
| 2002/0002683 | A1 * | 1/2002 | Benson et al. | 713/194 |
| 2003/0008432 | A1 | 1/2003 | Kux | |
| 2004/0227205 | A1 * | 11/2004 | Walmsley | 257/499 |

OTHER PUBLICATIONS

Internet citation: http://www.flylogic.net/blog/?p=86.

* cited by examiner

*Primary Examiner* — Michael Lebentritt
(74) *Attorney, Agent, or Firm* — Charles Bergere

(57) ABSTRACT

A system for generating a tamper detection signal indicating tampering with one or more circuits of an integrated circuit (IC) includes a tamper detection module, and wire-pairs connected to the tamper detection module and arranged in a winding configuration to form a wire-mesh. The wire-mesh is placed a predefined distance from the circuits. The tamper detection module generates and provides serial bit-streams to the wire-pairs for detecting a breach in the wire-mesh by an external probe.

10 Claims, 3 Drawing Sheets

SYSTEM FOR PREVENTING TAMPERING WITH INTEGRATED CIRCUIT

BACKGROUND OF THE INVENTION

The present invention generally relates to integrated circuits, and more particularly, to a system for preventing tampering of an integrated circuit.

Integrated circuits (ICs), such as those used in set-top boxes, engine control units (ECUs), and cryptographic systems, often store sensitive information including personal data, financial transaction authorization codes, security passwords, and secure session keys, and thus are prone to unauthorized access by hackers. A known technique used by hackers to gain access to information residing in an IC is micro-probing. Micro-probing involves forming an electrical contact with the IC by dropping fine-tipped probe needles directly on the point of interest of the IC, or on an area of the IC to which the point of interest is connected. The probe needles are held by a micro-manipulator that is controlled by the hacker to precisely land the probe needle on the IC.

To protect ICs from micro-probing, static wire-meshes have been designed that are placed close to the ICs. FIG. 1A is a schematic block diagram of a conventional static wire-mesh system 100. The static wire-mesh system 100 includes a conventional tamper detection module 102, a static wire-mesh 104, and first and second sets of wires 106 and 108. The first set of wires 106 includes a first wire segment 110 and the second set of wires 108 includes a second wire segment 112.

The first set of wires 106 is connected to a voltage supply (VDD) and to a low active tampering line of the tamper detection module 102, and the second set of wires 108 is connected to ground (GND) and to a high active tampering line of the tamper detection module 102. Wire segments associated with the first and second sets of wires 106 and 108, viz., the first and second wire segments 110 and 112, are placed in an alternating pattern to form the static wire-mesh 104 that protects an IC (not shown) from unauthorized access via probing. The wire segments 110, 112 are placed such that any two adjacent wire segments are at different potentials and spacing between adjacent wire segments is small enough to prevent a probe needle (not shown) from penetrating the static wire-mesh 104 without making contact with either of the wire segments. Contact of the probe needle with either of the wire segments causes the corresponding tampering lines, i.e., the high and low active tampering lines, to be activated, which in turn sets off a self-erase sequence that erases the sensitive information in the IC.

FIG. 1B is a schematic block diagram of the static wire-mesh system 100 after being altered to enable micro-probing. In addition to the elements depicted to be a part of FIG. 1A, the static wire-mesh system 100 includes first through fourth wire-connectors 114a-114d. FIG. 1B also shows a micro-probe 116 penetrating the wire mesh system 100.

The wire segments associated with the first set of wires 106 are shorted using the first and third wire-connectors 114a and 114c and the wire segments associated with the second set of wires 108 are shorted using the second and fourth wire-connectors 114b and 114d. A wire length between the first and third wire-connectors 114a and 114c and between the second and fourth wire-connectors 114b and 114d is cut to form a void large enough for an intrusion by the micro-probe 116. Since, the wire-segments are shorted, the conventional tamper detection module 102 does not detect the cutting of the wire segments and thus the intrusion by the micro-probe 116.

Although the static wire-mesh is efficient in thwarting direct micro-probing attempts, the static voltages used for detecting intrusions render the static wire-mesh vulnerable to being cut and easily bypassed. Further, since the wire segments are at constant potential, a hacker has a time for shorting and cutting the wire segments without activating the tampering lines and setting off the self-erase sequence.

Therefore, it would be advantageous to have a wire-mesh that does not use static voltages for micro-probe detection, that cannot be easily bypassed, and that overcomes the above-mentioned limitations of the conventional static wire-meshes.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE PRESENT INVENTION

Figure 1A:
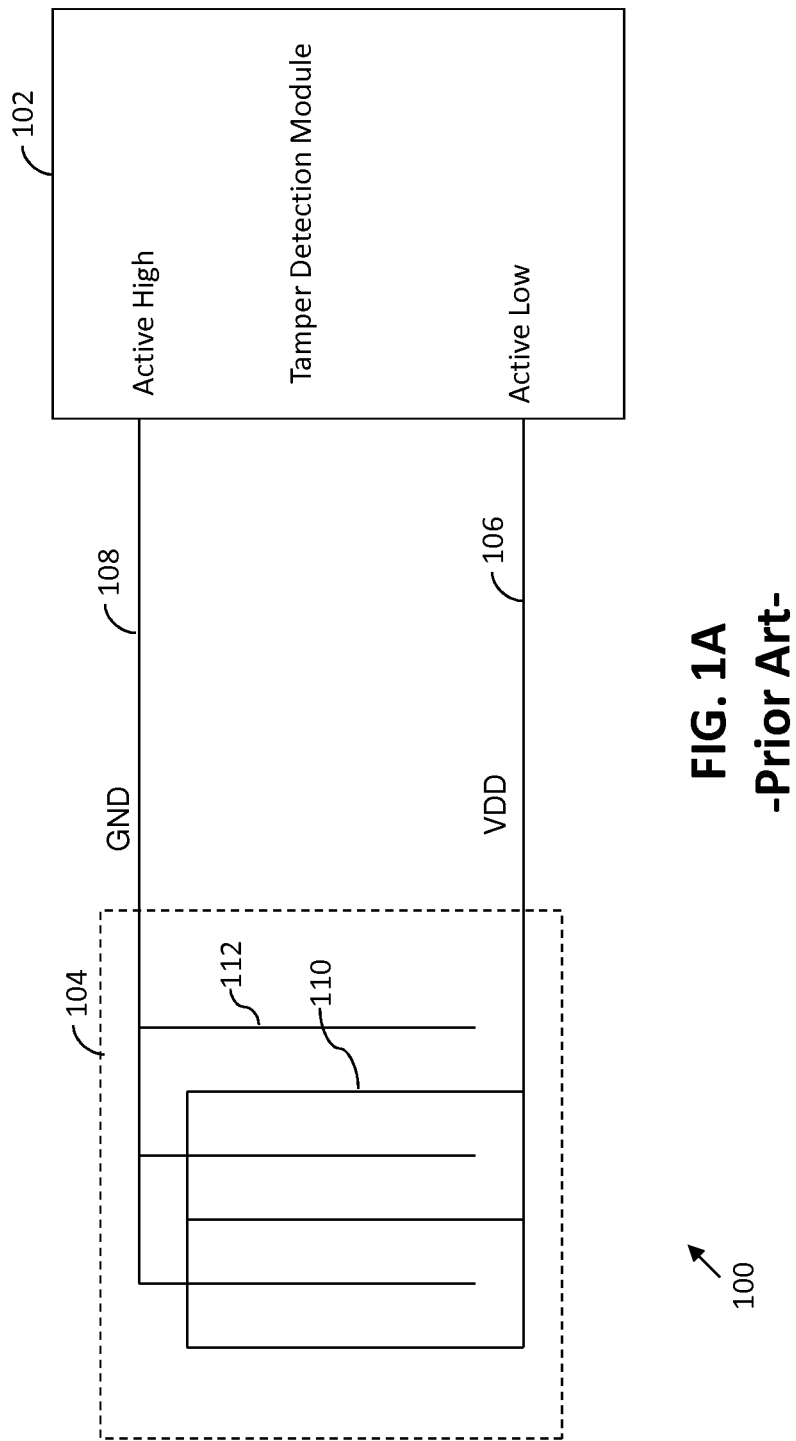
FIG. 1A is a schematic block diagram of a conventional static wire-mesh system.
Figure 1B:
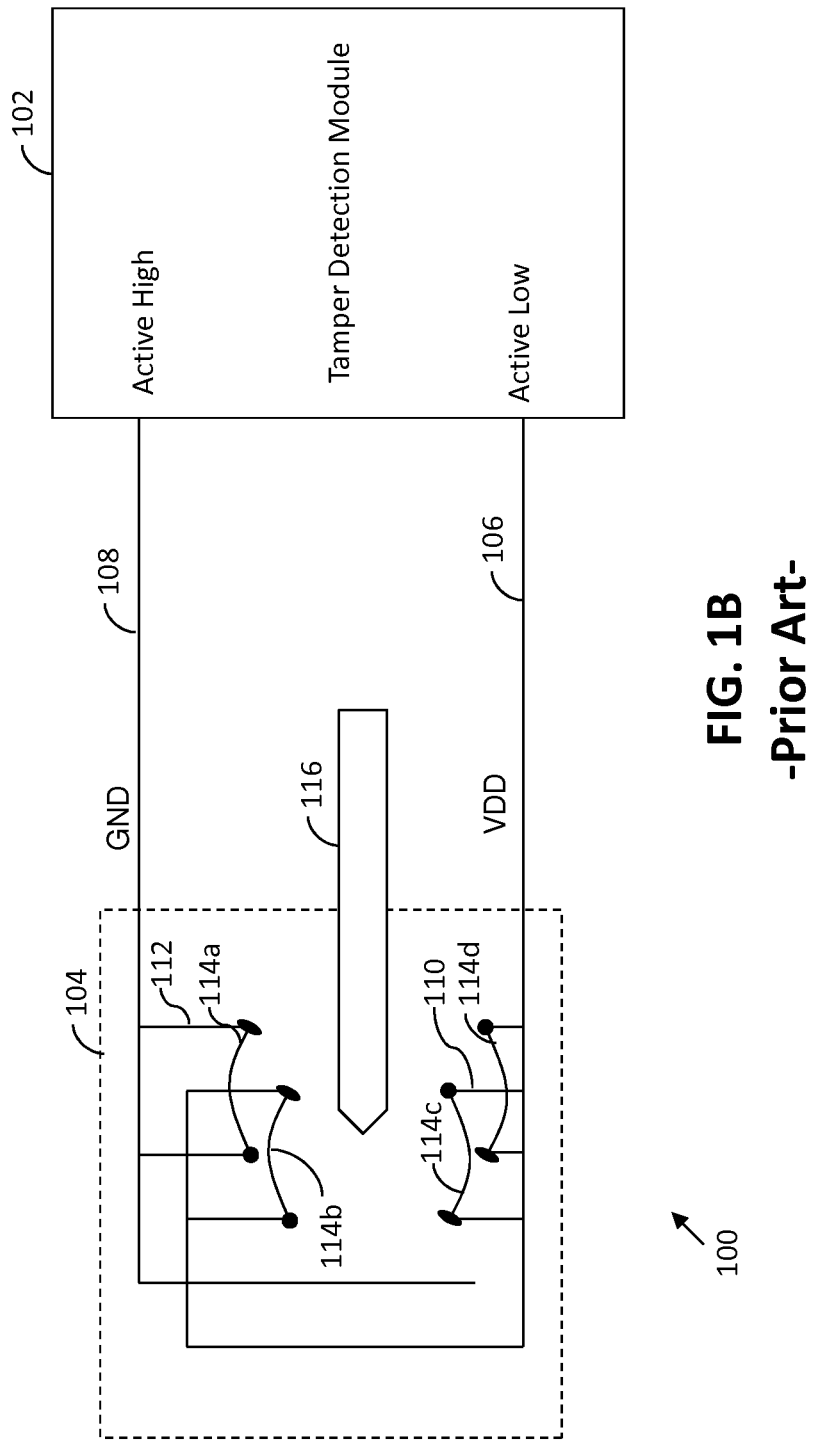
FIG. 1B is a schematic block diagram of the conventional static wire-mesh system altered to enable micro-probing.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a system for generating a tamper detection signal indicating tampering with one or more circuits of an integrated circuit (IC) is provided. The system includes a tamper detection module for generating a plurality of serial bit-streams based on a predetermined algorithm. The system further includes a plurality of pairs of wires connected to the tamper detection module and placed at a predefined distance from the one or more circuits. First terminals of first and second wires of a first pair of the plurality of pairs of wires are connected to first and second output terminals of the tamper detection module for receiving first and second serial bit-streams of the plurality of bit-streams, respectively.

Second terminals of the first and second wires are connected to first and second input terminals of the tamper detection module for providing third and fourth serial bit-streams to the tamper detection module, respectively. The tamper detection module compares the first serial bit-stream with the third serial bit-stream and the second serial bit-stream with the fourth serial bit-stream and generates the tamper detection signal.

Various embodiments of the present invention provide a system for generating a tamper detection signal indicating tampering with one or more circuits of an IC. The system includes a tamper detection module and wire-pairs arranged in a winding configuration to form a wire-mesh and connected to the tamper detection module. The wire-mesh is placed at a predefined distance from the circuits of the IC. The circuits are associated with a memory module of the IC and store sensitive information. The tamper detection module generates serial bit-streams based on a predetermined algorithm. Each serial bit-stream includes a random pattern of bits that are repeated at a predefined frequency. Each wire-pair is provided a complementary pair of serial bit-streams. The tamper detection module compares an input serial bit-stream provided at a first terminal of a wire in a wire-pair with an output serial bit-stream obtained at a second terminal of the wire subsequent to flowing through the wire-mesh. A difference in the input and output serial bit-streams implies an unauthorized attempt to access contents of the circuits or a breach in the wire-mesh brought on by a hacker trying to cut through the wire-mesh. The tamper detection module generates a tamper detection signal and sets-off an erase sequence for erasing contents of the circuits protected by the wire-mesh.

The wire-mesh continually receives varying bit sequence which renders micro-probing by a hacker extremely tough. Since, the bit sequence provided to the wire-pairs varies at a fast rate the hacker has a very small time-window (of one clock cycle) to short wire segments carrying identical serial bit-streams. Moreover the hacker does not have access to the reference clock that varies the bit sequence to be able to do this accurately. Since the bit sequence varies continuously (due to random patterns), the hacker will have to trace an entire bit sequence before a correct time instant can be identified for the break. Additionally, a glitch filter is disabled on the wire-mesh, thereby increasing sampling noise while the hacker tries to trace the bit sequence.

Figure 2:
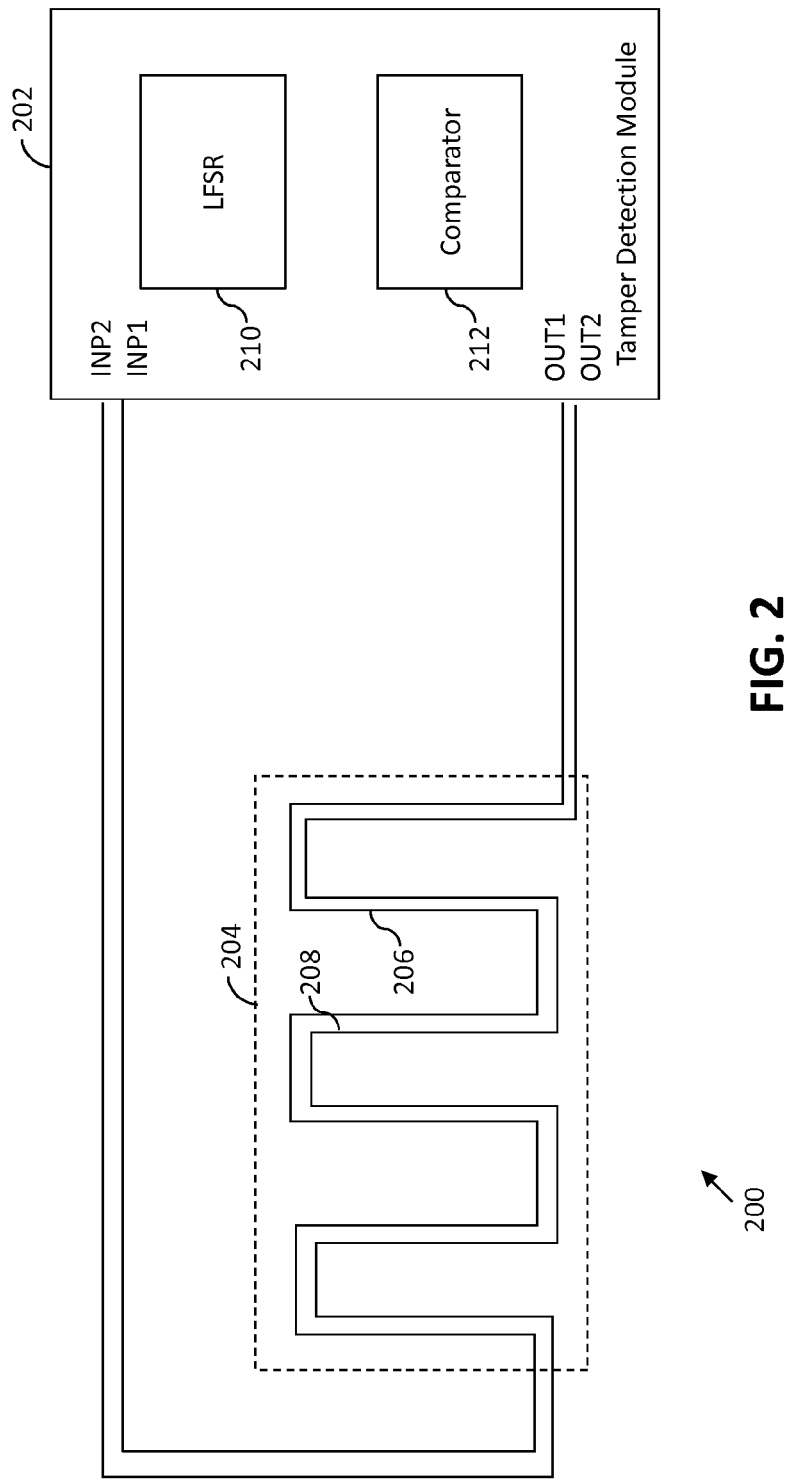
FIG. 2 is a schematic block diagram of a system for generating a tamper detection signal, in accordance with an embodiment of the present invention.

Referring now to FIG. 2, a system 200 for generating a tamper detection signal indicating tampering with circuits of an integrated circuit (IC) in accordance with an embodiment of the present invention, is shown. The system 200 includes a tamper detection module 202, a wire-mesh 204, and first and second wires 206 and 208.

First and second terminals of the first wire 206 are connected to the first output (OUT1) and first input (INP1) terminals of the tamper detection module 202, respectively. First and second terminals of the second wire 208 are connected to the second output (OUT2) and the second input terminals (INP2) of the tamper detection module 202, respectively. The first and second wires 206 and 208 are arranged in a winding configuration to form the wire-mesh 204 that has a separation between adjacent segments of the first and second wires 206 and 208 small enough for preventing a direct access by a probe needle (not shown). The wire-mesh 204 is placed at a predefined distance from circuits of the IC (not shown) to protect them from being micro-probed. In an embodiment of the present invention, the circuits are associated with a memory module (not shown) of the IC. The memory module stores sensitive information that may include personal data, financial transaction authorization codes, security passwords, and secure session keys.

The tamper detection module 202 generates first and second serial bit-streams at the first and second output terminals OUT1 and OUT2, respectively. In an embodiment of the present invention, the tamper detection module 202 includes a linear feedback shift register (LFSR) 210 that generates the first and second serial bit-streams based on a predetermined algorithm. The first and second serial bit-streams include a random pattern of bits that repeats based on a predefined frequency. The first and second serial bit-streams are transmitted to the first and second wires 206 and 208, respectively and the first and second wires 206 and 208 provide third and fourth serial bit-stream to the first and second input terminals INP1 and INP2 of the tamper detection module 202. In an embodiment of the present invention, the first serial bit-stream is a complement of the second serial bit-stream and the predefined frequency is in the range of 2 hertz (Hz) to 256 Hz.

The tamper detection module 202 compares the first serial bit-stream with the third serial bit-stream and the second serial bit-stream with the fourth serial bit-stream. In an embodiment of the present invention, the tamper detection module 202 includes a comparator 212 for comparing the first serial bit-stream with the third serial bit-stream and the second serial bit-stream with the fourth serial bit-stream. When the first and second serial bit-streams flow uninterrupted in the first and second wires 206 and 208, the first serial bit-stream is identical to the third serial bit-stream and the second serial bit-stream is identical to the fourth serial bit-stream. However, when either of the first and second serial bit-streams are interrupted due to a contact with the probe needle or due to an attempt to cut either of the wires 206 and 208, a difference between the first and third serial bit-streams or between the second and fourth serial bit-streams is detected. The tamper detection module 202 generates a tamper detection signal indicating an unauthorized attempt to bypass the wire-mesh 204 to access the integrated circuits protected by the wire-mesh 204. A memory erase sequence for erasing one or more values stored in the memory module is activated based on the tamper detection signal.

In various embodiments of the present invention, the system 200 includes several wire-pairs (not shown), viz., a first wire-pair including the first and second wires 206 and 208 arranged in a winding alternating configuration to form the wire-mesh 204. The alternating placement ensures two wires carrying identical serial bit-streams to never be adjacent. Additionally, a separation between any two adjacent wires is consistently maintained to be small enough to prevent the probe needle from intruding the wire-mesh 204 without making a contact with either of the adjacent wires. Each of the wire-pairs is provided a pair of complementary serial bit-streams generated by the tamper detection module 202. The serial bit-streams are generated by the LFSR based on the predetermined algorithm. As described above, the tamper detection module 202 compares an input and output serial bit-streams provided to each wire of each of the wire-pairs. A difference between the two implies a breach in the wire-mesh 204 leading to activation of an erase sequence.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A system for generating a tamper detection signal indicating tampering with one or more circuits of an integrated circuit (IC), comprising:

a tamper detection module for generating a plurality of serial bit-streams based on a predetermined algorithm; and a plurality of pairs of wires connected to the tamper detection module and placed at a predefined distance from the one or more circuits, wherein first terminals of first and second wires of a first pair of the plurality of pairs of wires are connected to first and second output terminals of the tamper detection module, respectively, for receiving first and second serial bit-streams of the plurality of bit-streams, respectively, wherein second terminals of the first and second wires are connected to first and second input terminals of the tamper detection module, respectively, for providing third and fourth serial bit-streams to the tamper detection module, and wherein the tamper detection module compares the first serial bit-stream with the third serial bit-stream and the second serial bit-stream with the fourth serial bit-stream and generates the tamper detection signal.

2. The system of claim 1, wherein the tamper detection module includes a liner feedback shift register (LFSR) for executing the predetermined algorithm.

3. The system of claim 1, wherein the first and second serial bit-streams have a predefined repetition frequency.

4. The system of claim 1, wherein the first serial bit-stream is a complement of the second serial bit-stream.

5. The system of claim 1, wherein the plurality of pairs of wires is arranged to form a wire-mesh.

6. The system of claim 5, wherein the wire-mesh reduces accessibility of a micro-probe to the one or more circuits.

7. The system of claim 1, wherein the tamper detection module further includes a comparator for comparing the first serial bit-stream with the third serial bit-stream and the second serial bit-stream with the fourth serial bit-stream to generate the tamper detection signal.

8. The system of claim 1, wherein the one or more circuits are associated with a memory module of the IC.

9. The system of claim 8, wherein the tamper detection module activates a memory erase sequence for erasing one or more values stored in the memory module based on the tamper detection signal.

10. The system of claim 1, wherein tampering with the one or more circuits includes micro-probing the one or more circuits.

* * * * *